(12) United States Patent
Dohi et al.

(10) Patent No.: US 10,421,169 B2
(45) Date of Patent: Sep. 24, 2019

(54) CUTTING TOOL HOLDING MECHANISM, CUTTING TOOL HOLDER AND MACHINE TOOL SYSTEM

(71) Applicant: FANUC CORPORATION, Yamanashi (JP)

(72) Inventors: Yoshiaki Dohi, Yamanashi-ken (JP); Naoki Akagawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/951,296

(22) Filed: Apr. 12, 2018

(65) Prior Publication Data

US 2018/0297162 A1    Oct. 18, 2018

(30) Foreign Application Priority Data

Apr. 13, 2017 (JP) .................................. 2017-079629

(51) Int. Cl.
    *B23Q 3/157*    (2006.01)
    *B23Q 11/10*    (2006.01)
    (Continued)

(52) U.S. Cl.
    CPC ........ *B23Q 11/1023* (2013.01); *B23B 31/003* (2013.01); *B23B 31/02* (2013.01);
    (Continued)

(58) Field of Classification Search
    CPC ..... B23B 2270/24; B23B 27/10; B23B 27/12; B23B 51/06; B23B 2231/24;
    (Continued)

(56) References Cited

U.S. PATENT DOCUMENTS 4,080,090 A * 3/1978 Kern ........................ B23G 5/14
                                                                  279/20
5,326,114 A    7/1994 Piotrowski
(Continued)

FOREIGN PATENT DOCUMENTS

DE    19945491 A1 *  4/2001
JP      1135402 A     5/1989
(Continued)

OTHER PUBLICATIONS

English Abstract and Machine Translation for Japanese Publication No. 2012-135831 A, published Jul. 19, 2012, 7 pgs.
(Continued)

*Primary Examiner* — Erica E Cadugan
(74) *Attorney, Agent, or Firm* — Fredrikson & Byron, P.A.

(57) ABSTRACT

A cutting tool holding mechanism for detachably holding a cutting tool includes: a collet chuck configured to clamp and unclamp the cutting tool; a piston disposed deeper on the proximal side of the spindle than the collet chuck and configured to urge the collet chuck by the pressure of a fluid supplied from the proximal side of the spindle in the direction from the proximal side toward the distal end side of the spindle so that the collet chuck unclamps the cutting tool; a spool valve provided in the piston and configured to open thanks to centrifugal force at the time when the spindle is turned, so as to supply the fluid fed from the spindle side to the cutting tool.

5 Claims, 6 Drawing Sheets

(51) Int. Cl.
  *B23B 31/20* (2006.01)
  *B23B 31/24* (2006.01)
  *B23Q 3/12* (2006.01)
  *B23B 31/36* (2006.01)
  *B23Q 5/04* (2006.01)
  *B23B 31/00* (2006.01)
  *B23B 31/02* (2006.01)
  *B23Q 11/00* (2006.01)
  *B23Q 3/155* (2006.01)

(52) U.S. Cl.
  CPC .......... *B23B 31/20* (2013.01); *B23B 31/201* (2013.01); *B23B 31/36* (2013.01); *B23Q 3/12* (2013.01); *B23Q 3/157* (2013.01); *B23Q 5/04* (2013.01); *B23B 2231/24* (2013.01); *B23B 2270/04* (2013.01); *B23B 2270/09* (2013.01); *B23B 2270/24* (2013.01); *B23Q 11/0075* (2013.01); *B23Q 2003/155411* (2016.11); *Y10T 279/17111* (2015.01); *Y10T 279/17529* (2015.01); *Y10T 279/3481* (2015.01); *Y10T 408/455* (2015.01); *Y10T 409/30952* (2015.01); *Y10T 409/304032* (2015.01); *Y10T 409/309408* (2015.01); *Y10T 483/15* (2015.01); *Y10T 483/1733* (2015.01)

(58) Field of Classification Search
  CPC ............ B23B 2250/12; B23B 2270/04; Y10T 279/17111; Y10T 409/303976; Y10T 409/304032; Y10T 408/44–46; B23Q 3/12; B23Q 11/10–11/1092; B23Q 11/1023; B23Q 11/1015; B23C 5/28; B23C 2250/12
  USPC ................ 279/20; 409/135–136; 408/56–61
  See application file for complete search history.

(56) References Cited

U.S. PATENT DOCUMENTS

| | | | | |
|---|---|---|---|---|
| 6,116,825 | A | * | 9/2000 | Kammermeier ........ B23B 51/06 279/20 |
| 6,543,319 | B1 | * | 4/2003 | Kress .................... B23B 29/034 82/50 |
| 2011/0070042 | A1 | | 3/2011 | Saito et al. |
| 2018/0200853 | A1 | * | 7/2018 | Dale .................. B23Q 11/1015 |

FOREIGN PATENT DOCUMENTS

| | | |
|---|---|---|
| JP | 05-060713 U | 8/1993 |
| JP | 9192963 A | 7/1997 |
| JP | 11-207507 A | 8/1999 |
| JP | 11-300511 A | 11/1999 |
| JP | 2012135831 A | 7/2012 |
| WO | 2004/041465 A1 | 5/2004 |

OTHER PUBLICATIONS

English Abstract and Machine Translation for Japanese Publication No. 09-192963 A, published Jul. 29, 1997, 9 pgs.
English Abstract and Machine Translation for Japanese Publication No. 01-135402 A, published May 29, 1989, 5 pgs.
English Abstract and Machine Translation for Japanese Publication No. 11-300511 A, published Nov. 2, 1999, 11 pages.
English Abstract and Machine Translation for Japanese Publication No. 11-207507 A, published Aug. 3, 1999, 20 pages.
English Machine Translation for Japanese Publication No. 05-060713 U, published Aug. 10, 1993, 9 pages.
English Machine Translation of Decision to Grant issued by Japan Patent Office (JPO) in Japanese Application No. 2017-079629, dated Oct. 30, 2018, 3 pages.
Untranslated Decision to Grant issued by Japan Patent Office (JPO) in Japanese Application No. 2017-079629, dated Oct. 30, 2018, 3 pages.

* cited by examiner

CUTTING TOOL HOLDING MECHANISM, CUTTING TOOL HOLDER AND MACHINE TOOL SYSTEM

CROSS-REFERENCE TO RELATED APPLICATION

This application is based upon and claims the benefit of priority from Japanese Patent Application No. 2017-079629 filed on Apr. 13, 2017, the contents of which are incorporated herein by reference.

BACKGROUND OF THE INVENTION

Field of the Invention

The present invention relates to a cutting tool holding mechanism, a cutting tool holder, and a machine tool system, for automatic unclamping of a cutting tool.

Description of the Related Art

Japanese Laid-Open Patent Publication No. 09-192963 discloses a configuration in which a piston is advanced by the pressure of coolant liquid, whereby a spring collet also moves forward, resulting in that a small-diameter tool is unclamped.

SUMMARY OF THE INVENTION

However, Japanese Laid-Open Patent Publication No. 09-192963 has a drawback that no coolant liquid (fluid) can be supplied into the small-diameter tool (cutting tool) during cutting work of a workpiece.

The present invention has been devised to solve the above problem. It is therefore an object of the present invention to provide a cutting tool holding mechanism, a cutting tool holder, and a machine tool system capable of supplying a fluid into a cutting tool during cutting of a workpiece.

The aspect of the present invention resides in a cutting tool holding mechanism provided in a spindle of a machine tool to detachably hold a cutting tool, which includes: a collet chuck configured to clamp and unclamp the cutting tool; a first elastic part disposed on the distal end side of the collet chuck and configured to elastically urge the collet chuck in the direction from the distal end side toward the proximal side of the spindle so that the collet chuck clamps the cutting tool; a piston disposed deeper on the proximal side of the spindle than the collet chuck and configured to urge the collet chuck by the pressure of a fluid supplied from the proximal side of the spindle in the direction from the proximal side toward the distal end side of the spindle so that the collet chuck unclamps the cutting tool; a spool valve provided in the piston and configured to open thanks to centrifugal force at the time when the spindle is turned, so as to supply the fluid fed from the spindle side to the cutting tool; and a second elastic part provided in the piston and configured to elastically urge the spool valve in a valve closing direction.

According to the present invention, it is possible to supply fluid into a cutting tool during cutting of a workpiece.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, the present invention will be described referring to embodiments of the invention. The invention specified in the scope of claims is not limited by the following embodiments. All combinations of features described in the embodiments are not necessarily essential to the solving means of the invention.

[Overall Structure of Machine Tool System]

Figure 1:
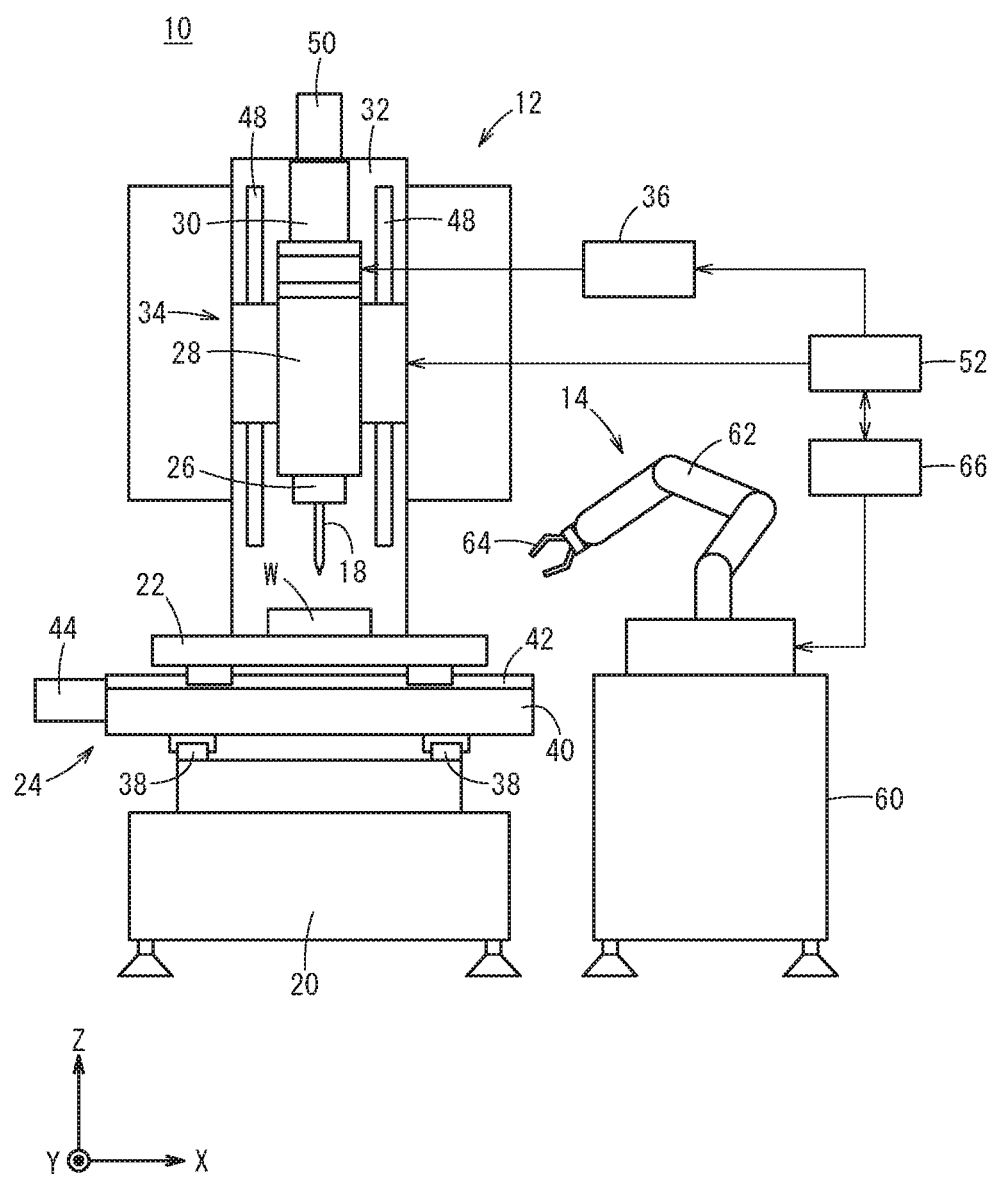
FIG. 1 is a schematic front view of a machine tool system.

FIG. 1 is a schematic front view of a machine tool system 10. The machine tool system 10 has a machine tool 12 and a robot 14.

The machine tool 12 performs cutting work on a workpiece W with a cutting tool 18 such as a drill attached to a spindle 26. The machine tool 12 includes a bed 20, a table 22, a table driving mechanism 24, the spindle 26, a spindle head 28, a spindle motor 30, a column 32, a spindle head driving mechanism 34, a coolant liquid supply mechanism 36, and a control unit 52.

Fixed on the table 22 is the workpiece W. The table driving mechanism 24 moves the table 22 in the X-axis direction and the Y-axis direction. The X-axis and the Y-axis are axes extending on a horizontal plane, and the X-axis and the Y-axis are orthogonal to each other. The table driving mechanism 24 is installed on the bed 20. The table driving mechanism 24 has Y-axis rails 38, an unillustrated Y-axis motor, a saddle 40, X-axis rails 42, and an X-axis motor 44.

The Y-axis rails 38 are provided on the bed 20 so as to extend in the Y-axis direction. The saddle 40 is arranged movably on the Y-axis rails 38 in the Y-axis direction. The Y-axis motor is a servomotor and is connected to the saddle 40 via an unillustrated ball screw mechanism. With the Y-axis motor driven, the Y-axis motor moves the saddle 40 in the Y-axis direction. The Y-axis motor is supported on the bed 20.

The X-axis rail 42 is provided on the saddle 40 and extends in the X-axis direction. The table 22 is arranged movably on the X-axis rails 42 in the X-axis direction. The X-axis motor 44 is a servomotor and is connected to the table 22 via an unillustrated ball screw mechanism. With the X-axis motor 44 driven, the X-axis motor 44 moves the table 22 in the X-axis direction. The X-axis motor 44 is supported by the saddle 40. The workpiece W placed on the table 22 can move in the X-axis direction and the Y-axis direction owing to the table driving mechanism 24.

The spindle head 28 supports the spindle 26 via a bearing 46 (FIG. 2) such that the spindle 26 is rotatable about the Z-axis. The spindle 26 is rotationally driven together with the cutting tool 18 by the spindle motor 30. The spindle head 28 is coupled with a pair of Z-axis rails 48 of the spindle head driving mechanism 34. The spindle head driving mechanism 34 include Z-axis rails 48, a Z-axis motor 50, and an unillustrated ball screw mechanism. The Z-axis rail 48 is provided on the column 32 and extends in the Z-axis direction orthogonal to the X-axis direction and the Y-axis direction. The Z-axis motor 50 is a servomotor and is connected to the spindle head 28 via the ball screw mechanism. As the Z-axis motor 50 is driven, the Z-axis motor 50 moves the spindle head 28 in the Z-axis direction. The Z-axis motor 50 is supported by the column 32. The spindle head driving mechanism 34 enables the spindle 26 to move in the Z-axis direction. The machine tool 12 can machine the workpiece W into an arbitrary three-dimensional shape owing to the movement of the spindle 26 in the Z-axis direction and the movement of the table 22 in the X-axis direction and the Y-axis direction.

The coolant liquid supply mechanism 36 is composed of an unillustrated storage tank for storing a coolant liquid, an unillustrated pump for supplying the coolant liquid in the storage tank into the spindle 26, and others. The coolant liquid supply mechanism 36 supplies the coolant liquid to the spindle 26 during machining of the workpiece W. The coolant liquid supplied to the spindle 26 is ejected from the tip of the cutting tool 18 to cool the workpiece W and the cutting tool 18 and to discharge cutting chips. The coolant liquid supply mechanism 36 also supplies the coolant liquid into the spindle 26 when the cutting tool 18 is replaced. The supply of the coolant liquid at the time of replacing the cutting tool 18 will be detailed later.

The control unit 52 includes a processor, a storage device, a power supply circuit, and the like, and outputs control signals for controlling the spindle motor 30, the Y-axis motor, the X-axis motor 44 and the Z-axis motor 50, the pump of the coolant liquid supply mechanism 36, and the like, in accordance with a program stored in the storage device or in accordance with an operation by an operator.

The robot 14 is installed on a base 60 arranged near the machine tool 12. The robot 14 changes the cutting tool 18 of the machine tool 12. The robot 14 has an arm 62, a hand 64, and a control unit 66. The arm 62 has multiple joints, and the hand 64 attached to the distal end thereof. Each joint of the arm 62 is driven by a joint motor (not shown), and the hand 64 is driven by an unillustrated hand motor. The arm 62 is stretched toward the spindle 26 of the machine tool 12 so as to change the cutting tool 18 with the hand 64. The control unit 66 has a processor, a storage device, a power supply circuit, and others, and computes and outputs control signals for controlling the joint motors for driving the joints of the arm 62, the hand motor for driving the hand 64, and others in accordance with programs stored in the storage device or in accordance with an operation by an operator.

[Configuration of Spindle]

Figure 2:
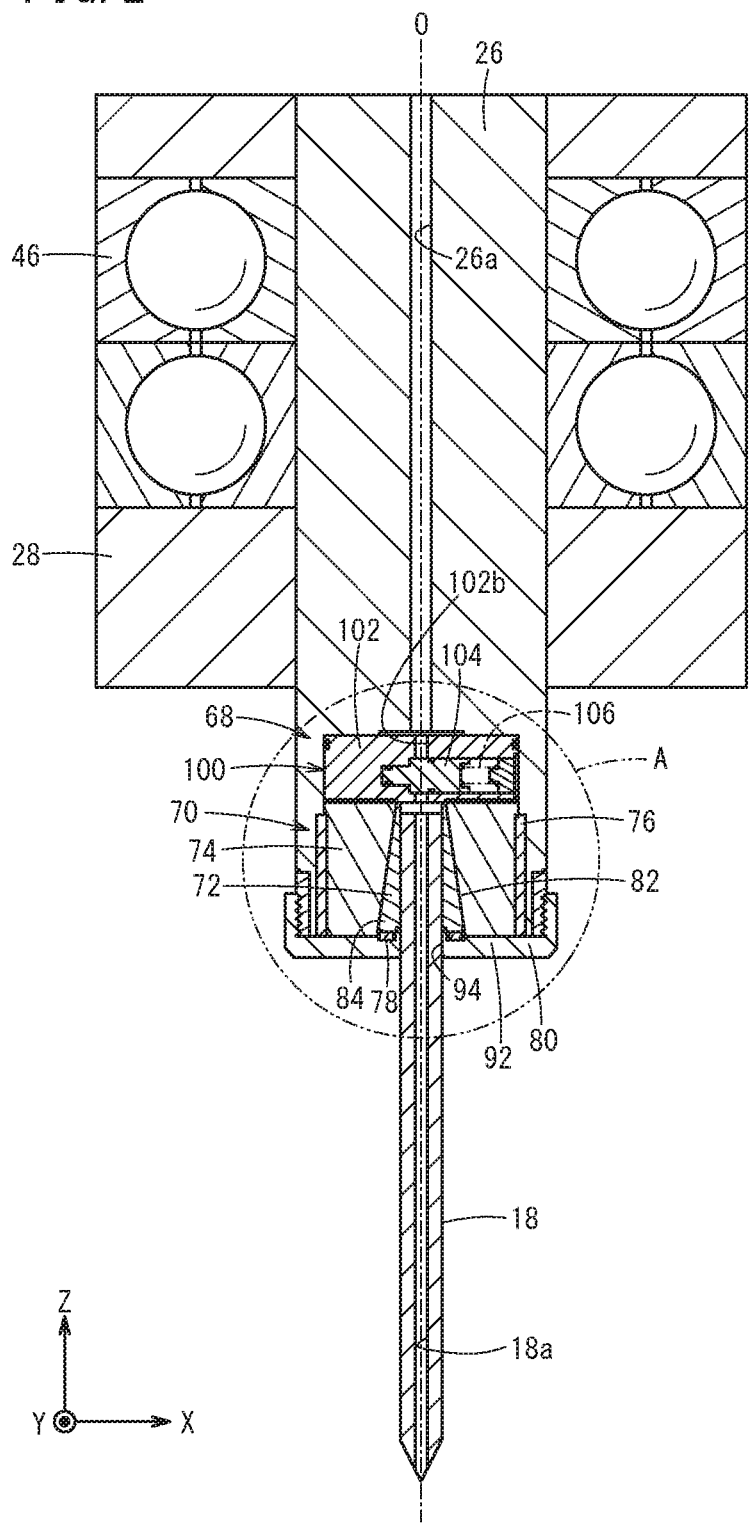
FIG. 2 is a schematic sectional view showing a configuration of a spindle, a spindle head, and a cutting tool.
Figure 3:
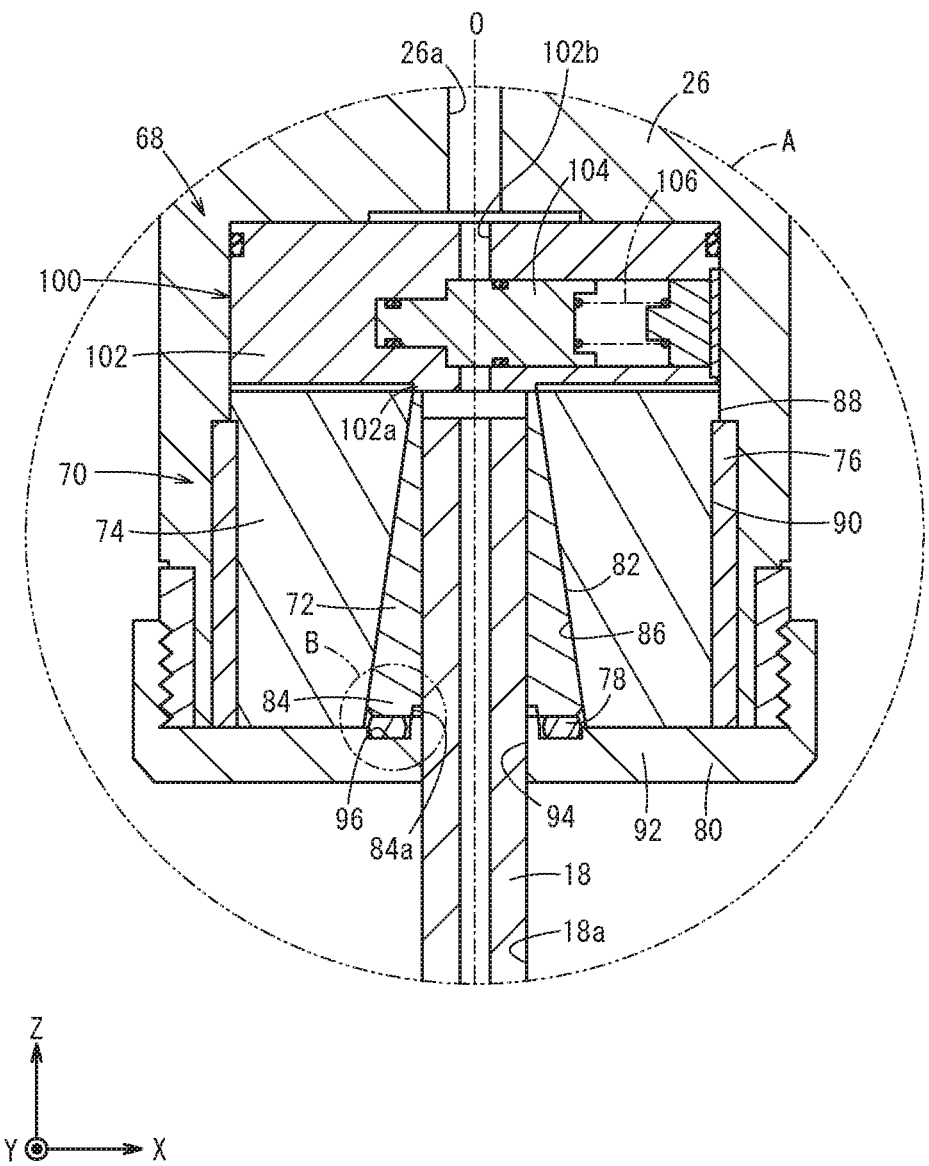
FIG. 3 is an enlarged view of a range indicated by a circle A in FIG. 2.
Figure 4:
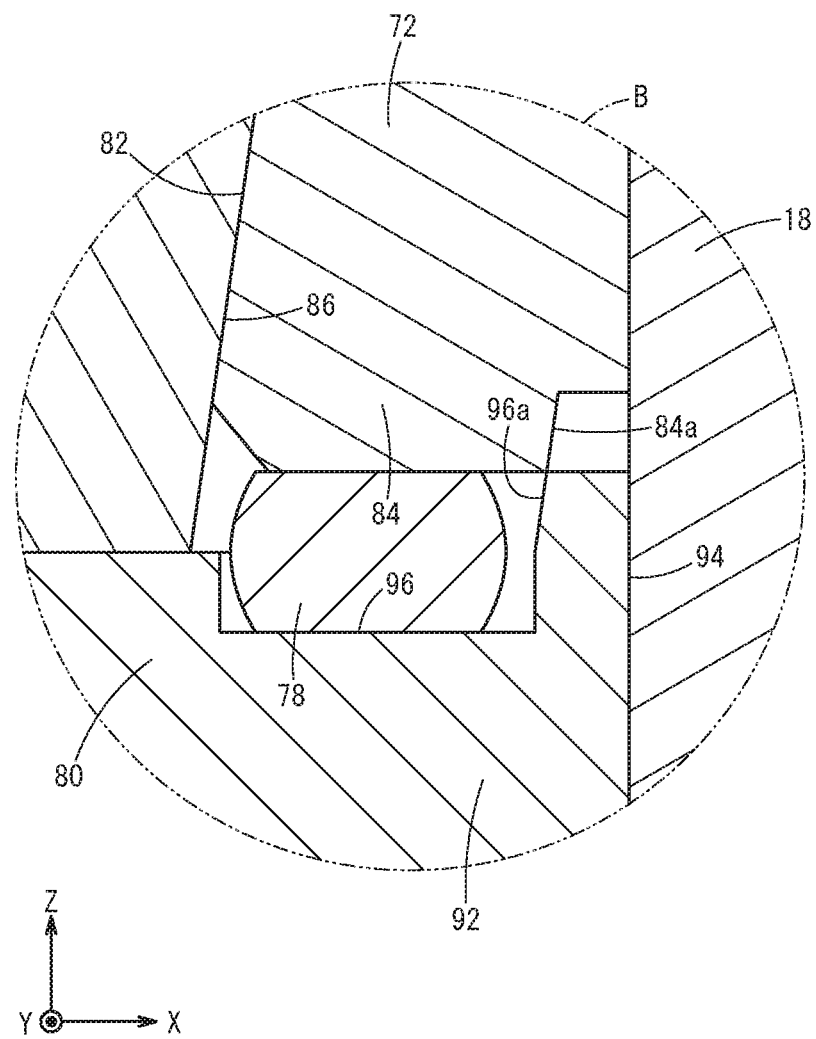
FIG. 4 is an enlarged view of a range indicated by a circle B in FIG. 3.

FIG. 2 is a schematic sectional view showing the configuration of the spindle 26, the spindle head 28, and the cutting tool 18. FIG. 3 is an enlarged view of a range indicated by a circle A in FIG. 2. FIG. 4 is an enlarged view of a range indicated by a circle B in FIG. 3. The spindle 26 is formed with a conduit 26a that extends on the rotary axis O in the Z-axis direction and is supplied with the coolant liquid from the coolant liquid supply mechanism 36. The cutting tool 18 has a conduit 18a that extends on the rotary axis O in the Z-axis direction and is supplied with the coolant liquid from the conduit 26a of the spindle 26.

Provided at the distal portion on the negative Z-axis direction side of the spindle 26 is a cutting tool holding mechanism 68 that detachably holds the cutting tool 18. The cutting tool holding mechanism 68 has a chuck 70 arranged on the negative Z-axis direction side of the spindle 26 and a piston 100 arranged on the positive Z-axis direction side.

(Structure of Chuck)

The chuck 70 has a collet chuck 72, a chuck body 74, a collet holder 76, a disc spring 78, and a cap nut 80.

The collet chuck 72 is a cylindrical member, and the cutting tool 18 is inserted into the inner periphery thereof. The collet chuck 72 has a tapered surface 82 formed on its outer peripheral surface so that the outer diameter of the tapered surface 82 gradually increases from the positive Z-axis direction side toward the negative Z-axis direction side. The collet chuck 72 has a plurality of slits formed therein extending in the Z-axis direction. The slits are formed so as to be spaced from each other in the circumferential direction. At the end portion on the negative Z-axis direction side of the collet chuck 72, a projected portion 84 that protrudes in the negative Z-axis direction is formed. Formed on the inner periphery of the projected portion 84 is an engaged portion 84a that is tapered such that the inner diameter of the engaged portion 84a gradually increases from the positive Z-axis direction side toward the negative Z-axis direction side.

The chuck body 74 is a cylindrical member and has an inner tapered surface 86 so that its inner diameter gradually increases from the positive Z-axis direction side toward the negative Z-axis direction side. The chuck body 74 accommodates and keeps the collet chuck 72 movable in the Z-axis direction with the tapered surface 82 of the collet chuck 72 put in contact with the tapered surface 86 of the chuck body 74. The collet chuck 72 is configured so that when the collet chuck 72 moves inside the chuck body 74 in the positive Z-axis direction, the inner diameter of the collet chuck 72 decreases so as to clamp the cutting tool 18. On the other hand, when the collet chuck 72 moves inside the chuck body 74 in the negative Z-axis direction, the inner diameter of the collet chuck 72 expands to unclamp the cutting tool 18. On the outer peripheral surface of the chuck body 74, a large-diameter portion 88 is formed on the positive Z-axis direction side and a small-diameter portion 90 is formed on the negative Z-axis direction side of the large-diameter portion 88. The outer diameter of the small-diameter portion 90 is smaller than the outer diameter of the large-diameter portion 88.

The collet holder 76 is a cylindrical member having an inner diameter smaller than the outer diameter of the large-diameter portion 88 of the chuck body 74 and larger than the outer diameter of the small-diameter portion 90. The collet holder 76 is press-fitted between the spindle 26 and the chuck body 74 in a state in which the chuck body 74 is inserted in the interior of the spindle 26. As a result, the chuck body 74 is coaxially arranged with respect to the rotary axis O of the spindle 26 by the collet holder 76. Further, the positive Z-axis side surface of the collet holder 76 abuts against the stepped surface between the large diameter portion 88 and the small diameter portion 90 of the collet chuck 72, whereby the movement of the collet chuck 72 in the Z-axis direction is restricted.

The cap nut 80 is a lid-like member, and is attached by being screwed on the outer peripheral portion at the negative Z-axis direction side end of the spindle 26. The cap nut 80 has a bottom portion 92 with a through hole 94 in the center thereof. A cutting tool 18 penetrates through the through hole 94. A depressed portion 96 which is an annular groove is formed around the through hole 94 on the positive Z-axis direction side surface of the bottom portion 92 of the cap nut 80. Placed in the depressed portion 96 is the disc spring 78. The disc spring 78 abuts on the projected portion 84 of the collet chuck 72 so as to urge the collet chuck 72 in the positive Z-axis direction. When the cap nut 80 is turned in the closing direction to be closed, the collet chuck 72 moves in the positive Z-axis direction and clamps the cutting tool 18. When the cap nut 80 is turned in the opening direction to be opened, the collet chuck 72 moves in the negative Z-axis direction and unclamps the cutting tool 18. An engaging portion 96a is formed on the positive Z-axis direction side of an inner circumferential side surface of the depressed portion 96 such that the outer diameter of the engaging portion 96a gradually increases from the positive Z-axis direction side toward the negative Z-axis direction side. When the collet chuck 72 moves in the negative Z-axis direction side, the engaging portion 96a engages with the engaged portion 84a of the collet chuck 72 and expands the diameter of the collet chuck 72.

(Structure of Piston)

The piston 100 has a main part 102, a spool valve 104, and a coil spring 106. The main part 102 is a substantially disc-shaped member and is provided slidably in the Z-axis direction relative to the spindle 26. Formed on the negative Z-axis direction side surface of the main part 102 is a projected portion 102a projecting in the negative Z-axis direction. When viewed from the negative Z-axis direction side, the projected portion 102a is formed in a circular shape, having an outer diameter smaller than the inner diameter of the tapered surface 86 opening in the positive Z-axis direction side surface of the chuck body 74, and having a greater diameter than the inner diameter of the collet chuck 72. When the main part 102 moves in the negative Z-axis direction, the projected portion 102a presses the collet chuck 72 to the negative Z-axis direction side, thereby unclamping the cutting tool 18.

Figure 5:
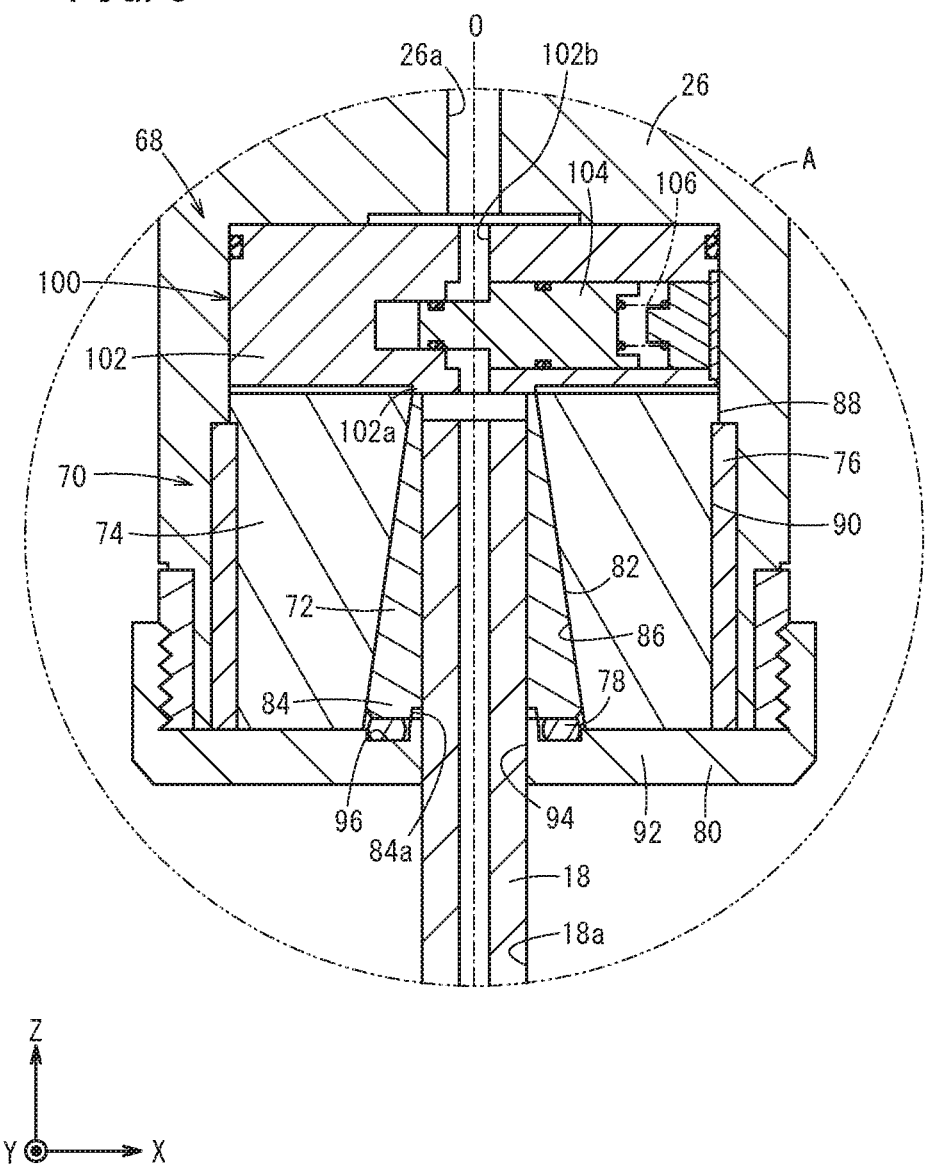
FIG. 5 is an enlarged view of the range indicated by the circle A in FIG. 2, showing a state in which the spindle is rotating.

The main part 102 is formed with a conduit 102b, which extends in the Z-axis direction on the rotary axis O of the spindle 26. The positive Z-axis direction side of the conduit 102b communicates with the conduit 26a of the spindle 26 while the negative Z-axis direction side of the conduit 102b is connected to the conduit 18a of the cutting tool 18. The spool valve 104 opens and closes the conduit 102b. The spool valve 104 slides in a direction orthogonal to the Z-axis direction inside the main part 102 and is urged by the coil spring 106 toward a direction in which the conduit 102b is closed. FIG. 5 is an enlarged view of a range indicated by the circle A in FIG. 2, showing a state when the spindle 26 is rotating. As shown in FIG. 5, when the spindle 26 rotates, the spool valve 104, due to centrifugal force, moves, against the urging force of the coil spring 106, toward a direction in which the conduit 102b is opened.

[Operation of Cutting Tool Holding Mechanism]

When the spindle 26 is at rest, the spool valve 104 is urged by the coil spring 106 and closes the conduit 102b. Under the condition, when the coolant liquid is supplied to the conduit 26a of the spindle 26 by the coolant liquid supply mechanism 36, the piston 100 as a whole moves in the negative Z-axis direction, thanks to the pressure of the coolant liquid. As a result, the projected portion 102a of the main part 102 presses the collet chuck 72 toward the negative Z-axis direction side, whereby the cutting tool 18 is unclamped.

When the spindle 26 is rotating, the spool valve 104 is moved by the centrifugal force against the urging force of the coil spring 106 to open the conduit 102b. At this time, when the coolant liquid is supplied to the conduit 26a of the spindle 26 by the coolant liquid supply mechanism 36, the coolant liquid passes through the conduit 102b of the main part 102 and is supplied to the conduit 18a of the cutting tool 18. As a result, the coolant liquid is ejected from the tip of the cutting tool 18 to cool the cutting tool 18 and the workpiece W and discharge cutting chips.

[Operation and Effect]

The piston 100 is moved using pressure of the coolant liquid, the collet chuck 72 is pressed by the piston 100, and the cutting tool 18 is unclamped. For this purpose, it is necessary to stop the flow of the coolant liquid by the piston 100. However, when the flow of the coolant liquid is blocked by the piston 100, the coolant liquid cannot be supplied to the conduit 18a of the cutting tool 18. Therefore, the coolant liquid cannot be ejected from the tip of the cutting tool 18 during machining.

To solve this problem, in the cutting tool holding mechanism 68 of this embodiment, the main part 102 of the piston 100 is provided with the spool valve 104 that opens and closes the conduit 102b. When the spindle 26 is at rest, the spool valve 104 is urged by the coil spring 106 and closes the conduit 102b. When the spindle 26 is rotating, the spool valve 104 is moved by the centrifugal force and made open so as to establish communication with the conduit 102b. Thereby, when the spindle 26 is at rest, the cutting tool 18 can be automatically unclamped by the chuck 70, and when the spindle 26 is rotating, the coolant liquid can be supplied to the conduit 18a of the cutting tool 18.

Further, in the cutting tool holding mechanism 68 of the present embodiment, the engaging portion 96a is formed in the bottom portion 92 of the cap nut 80, and the engaged portion 84a is formed in the projected portion 84 of the collet chuck 72. As a result, when the collet chuck 72 moves in the negative Z-axis direction, the engaging portion 96a and the engaged portion 84a are engaged with each other, so that the collet chuck 72 can be reliably enlarged in diameter.

Second Embodiment

Figure 6:
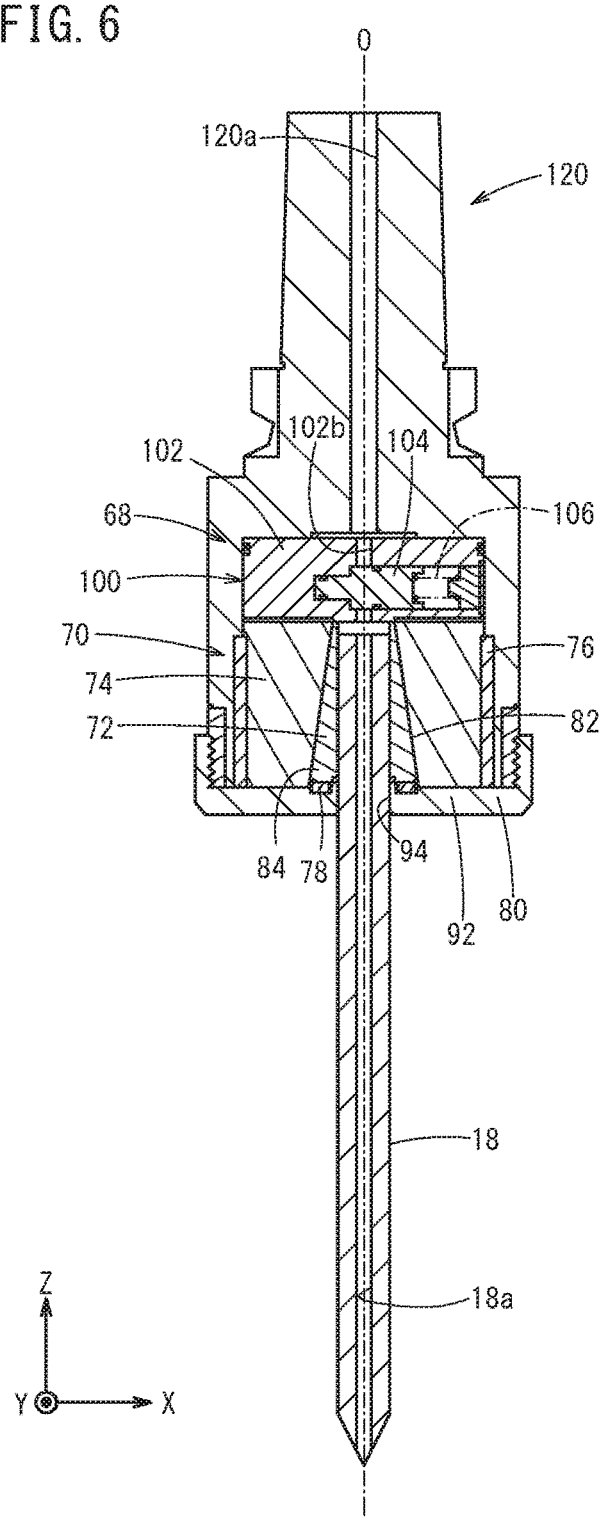
FIG. 6 is a schematic sectional view showing a configuration of a cutting tool holder.

In the first embodiment, the cutting tool holding mechanism 68 is provided in the distal end portion on the negative Z-axis direction side of the spindle 26, whereas, in the second embodiment, a cutting tool holding mechanism 68 is provided in the distal end portion on the negative Z-axis direction side of a cutting tool holder 120, which is detachably attached to a spindle 26. FIG. 6 is a schematic sectional view showing the configuration of the cutting tool holder 120.

The configuration of the cutting tool holding mechanism 68 is the same as that of the first embodiment. The cutting tool holder 120 is formed with a conduit 120a that extends on the rotary axis O in the Z-axis direction to allow the coolant liquid to be supplied from a conduit 26a of the spindle 26. The conduit 120a communicates with the positive Z-axis direction side of a conduit 102b of a main part 102 of a piston 100.

Operation and Effect

In this embodiment, the cutting tool holder 120 is provided with the cutting tool holding mechanism 68 similar to that in the first embodiment. Accordingly, even with a machine tool 12 in which a cutting tool 18 is attached to the spindle 26 via the cutting tool holder 120, this configuration enables the chuck 70 to automatically unclamp the cutting tool 18 when the spindle 26 is at rest as well as to supply the coolant liquid to the conduit 18a of the cutting tool 18 when the spindle 26 is turning.

Other Embodiments

Though the present invention has been described by referring to the embodiments, the present invention should not be limited to the above embodiments. It goes without saying that various modifications and improvements can be added to the above embodiments. Further, it is also apparent from the scope of claims that embodiments added with such modifications and improvements can be incorporated in the technical scope of the invention.

[Technical Idea Obtained from the Embodiments]

Technical ideas that can be grasped from the above embodiments will be described below.

A cutting tool holding mechanism (68) provided in a spindle (26) of a machine tool (12) to detachably hold a cutting tool (18), includes: a collet chuck (72) configured to clamp and unclamp the cutting tool (18);

a first elastic part (78) disposed on the distal end side of the collet chuck (72) and configured to elastically urge the collet chuck (72) in the direction from the distal end side toward the proximal end side of the spindle (26) so that the collet chuck (72) clamps the cutting tool (18); a piston (100) disposed on the more proximal end side of the spindle (26) than the collet chuck (72) and configured to urge the collet chuck (72) by the pressure of fluid supplied from the proximal end side of the spindle (26) in the direction from the proximal end side toward the distal end side of the spindle (26) so that the collet chuck (72) unclamps the cutting tool (18); a spool valve (104) provided in the piston (100) and configured to open thanks to centrifugal force at the time when the spindle is turned, so as to supply the fluid fed from the spindle (26) side to the cutting tool; and a second elastic part (106) provided in the piston (100) and configured to elastically urge the spool valve (104) in a valve closing direction. Thus, when the spindle (26) is at rest, the collet chuck (72) can automatically unclamp the cutting tool (18), whereas the fluid can be supplied to the conduit (18a) of the cutting tool (18) when the spindle (26) is rotating.

The cutting tool holding mechanism (68) may include a tapered portion (96a) arranged on the distal end side of the collet chuck (72) and configured to engage with the inner peripheral surface of the collet chuck (72) when the collet chuck (72) moves in the direction from the proximal side to the distal end side of the spindle (26), so as to cause the collet chuck (72) to expand the diameter thereof. As a result, when the collet chuck (72) moves to the distal end side of the spindle (26), the collet chuck (72) can be reliably expanded by the tapered portion (96a).

In the cutting tool holding mechanism (68), the machine tool (12) may include a coolant liquid supply mechanism (36) configured to supply a coolant liquid to a conduit (26a) formed on a rotary axis (0) of the spindle (26). The fluid may be the coolant liquid supplied from the coolant liquid supply mechanism (36). As a result, when the spindle (26) is rotating, the coolant liquid can be supplied to the conduit (18a) of the cutting tool (18), so as to cool the cutting tool (18) and the workpiece (W) and discharge cutting chips.

A cutting tool holder (120) configured to be detachably held by the spindle (26), includes the above-described cutting tool holding mechanism (68). As a result, even with a machine tool (12) in which a cutting tool (18) is attached to the spindle (26) via the cutting tool holder (120), the collet chuck (72) can automatically unclamp the cutting tool (18) when the spindle (26) is at rest as well as to supply the coolant liquid to the conduit (18a) of the cutting tool (18) when the spindle (26) is turning.

A machine tool system (10) includes: a machine tool (12) having the cutting tool holding mechanism (68) according to claim 1; and a robot configured to change the cutting tool (18). This enables the cutting tool (18) to be automatically changed.

What is claimed is:

1. A cutting tool holding mechanism provided in a spindle of a machine tool to detachably hold a cutting tool, the spindle and cutting tool holding mechanism together defining a proximal end and an opposite distal end, the cutting tool holding mechanism comprising:
    a collet chuck configured to clamp and unclamp the cutting tool;
    a first elastic part disposed on a distal end side of the collet chuck and configured to elastically urge the collet chuck in a direction from the distal end side of the collet chuck toward a proximal side of the spindle so that the collet chuck clamps the cutting tool;
    a piston disposed deeper towards the proximal side of the spindle than the collet chuck is and configured to urge the collet chuck by pressure of fluid supplied from the proximal side of the spindle in the direction from the proximal side toward a distal end side of the spindle so that the collet chuck unclamps the cutting tool;
    a spool valve provided in the piston and configured to open owing to centrifugal force caused when the spindle is turned, so as to supply the fluid fed from the spindle to the cutting tool; and
    a second elastic part provided in the piston and configured to elastically urge the spool valve in a valve closing direction.

2. The cutting tool holding mechanism according to claim 1, further comprising a tapered portion arranged on the distal end side of the collet chuck and configured to engage with a peripheral surface of a cap nut when the collet chuck moves in a direction from the proximal end towards the distal end side of the spindle, so as to cause the collet chuck to expand a diameter thereof.

3. The cutting tool holding mechanism according to claim 1, wherein:
    the machine tool includes a coolant liquid supply mechanism configured to supply a coolant liquid to a conduit formed on a rotary axis of the spindle; and
    the fluid is the coolant liquid supplied from the coolant liquid supply mechanism.

4. A cutting tool holder comprising the cutting tool holding mechanism according to claim 1, configured to be detachably held by the spindle.

5. A machine tool system comprising:
    a machine tool having the cutting tool holding mechanism according to claim 1; and
    a robot configured to change the cutting tool.

* * * * *